United States Patent [19]

Swanner

[11] Patent Number: 5,564,883
[45] Date of Patent: Oct. 15, 1996

[54] LEVER-OPERATED PIVOTING-BED TRAILER

[76] Inventor: Melvin B. Swanner, 215 N. Montgomery, Sherman, Tex. 75090

[21] Appl. No.: 303,765

[22] Filed: Sep. 9, 1994

[51] Int. Cl.$^6$ ........................................... B60P 1/28
[52] U.S. Cl. ................................................ 414/483
[58] Field of Search ................................ 414/482–485

[56] References Cited

U.S. PATENT DOCUMENTS

| | | | |
|---|---|---|---|
| 2,990,966 | 7/1961 | Schramm | 414/484 X |
| 3,061,124 | 10/1962 | Schueller | 414/483 |
| 3,901,398 | 8/1975 | Bunch | 414/483 |
| 4,051,967 | 10/1977 | Sedgwick et al. | 414/483 |
| 4,395,185 | 7/1983 | Whaley | 414/483 |
| 4,417,841 | 11/1983 | Chadwick | 414/483 X |
| 4,659,100 | 4/1987 | Welker | 414/483 X |
| 4,813,841 | 3/1989 | Eischen | 414/485 X |
| 4,944,648 | 7/1990 | Parr | 414/483 |
| 4,946,332 | 8/1990 | Daniels | 414/483 X |
| 5,308,213 | 5/1994 | Gilbertson | 414/483 X |

*Primary Examiner*—David A. Bucci
*Attorney, Agent, or Firm*—Jerry C. Ray

[57] ABSTRACT

The forward portion of a cargo trailer bed is pivotally supported within a U-shaped frame; the rearward portion of the bed is supported by a lift bar pivotally attached to a rear of the frame, the lift bar acting as a lever to lower the rear end of the bed to ground level and to raise the bed to a loaded position for towing.

2 Claims, 6 Drawing Sheets

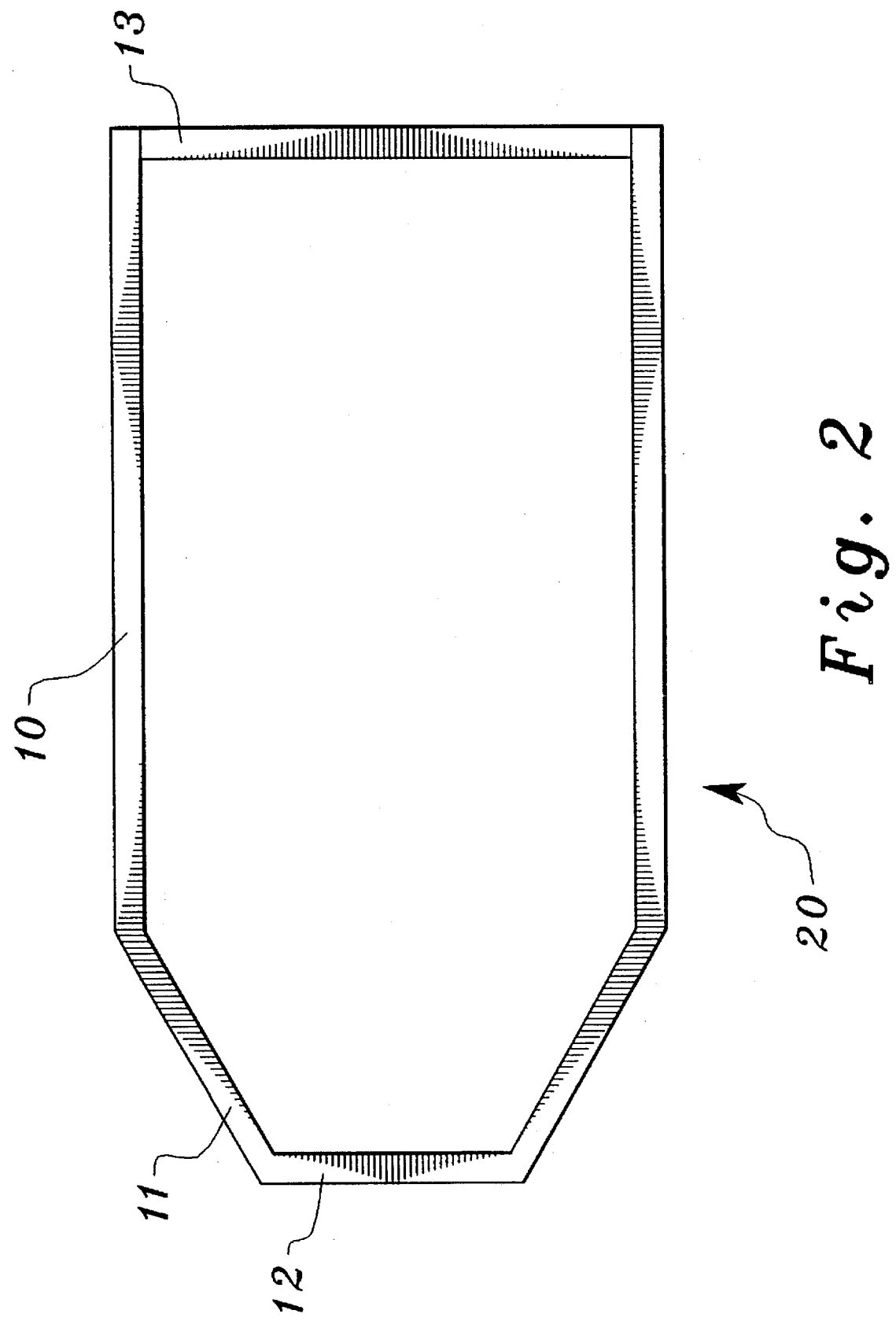

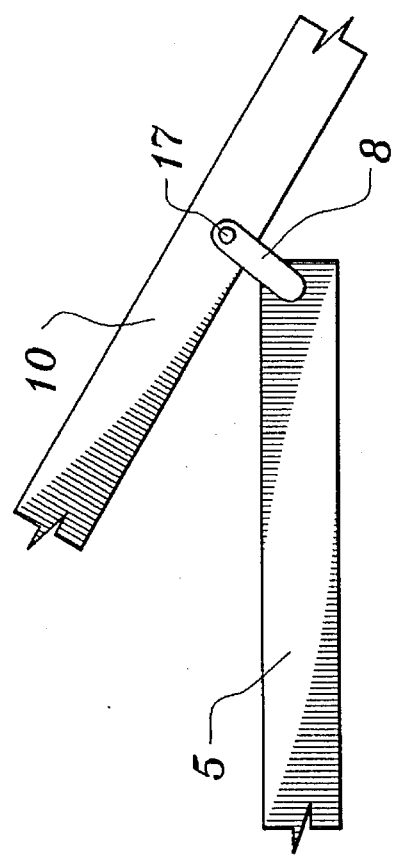
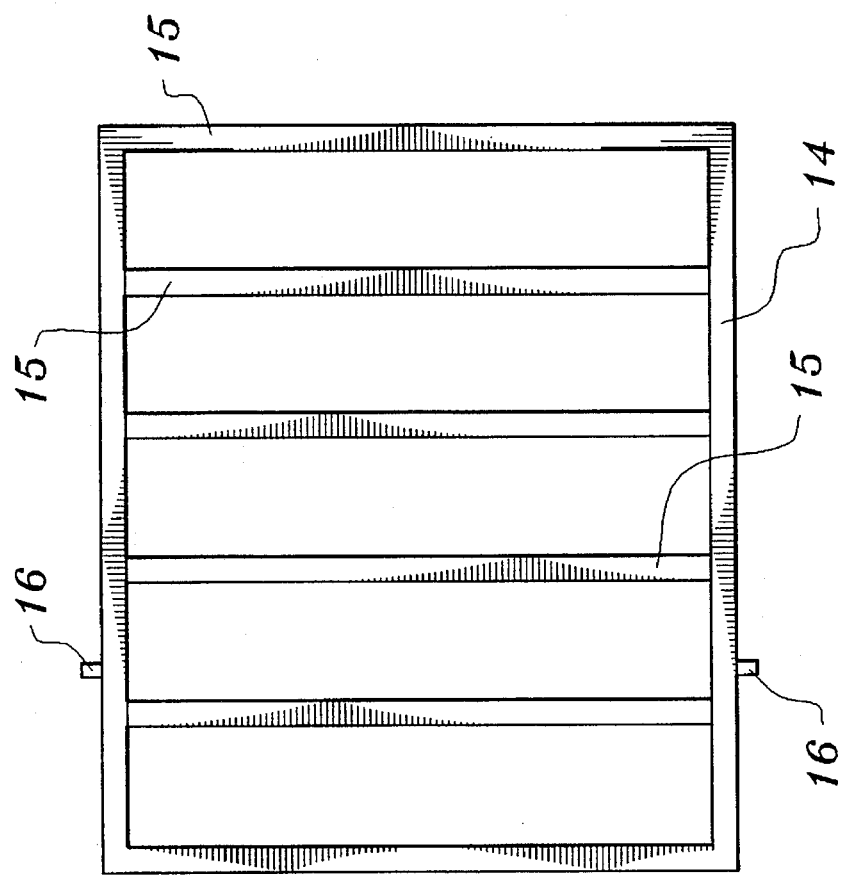
Fig. 4
Fig. 3

LEVER-OPERATED PIVOTING-BED TRAILER

CROSS REFERENCE TO RELATED APPLICATIONS

None.

BACKGROUND OF THE INVENTION

1. Field of the Invention

This invention relates to cargo-carrying trailers having moveable beds, and particularly to tilt-bed trailers which may be raised and lowered manually by means of a lift bar serving as a lever.

2. Description of the Related Art

Manually-operated tilt bed trailers vary considerably in size and load capacity, but most are in the small to intermediate sizes. The problem common to all tilt-bed designs is to provide means to efficiently lower the bed to a loading position, i.e, in contact with the ground, and then to raise the bed back to a loaded position for towing.

SUMMARY OF THE INVENTION

According to the invention, a trailer frame has side rails between which a trailer bed is supported. On an inner side of each side rail is a bed bracket, which receives a bed pin extending from either side of the bed platform. The bed pins pivotally engage the bed brackets, provide support points for a forward portion of the bed, and allow the bed to rotate on the bed pins.

The rear end of the bed platform is supported by a lift bar. A lift bar bracket is attached to a rear end of each frame side rail. These lift bar brackets receive lift bar pins, and act as fulcrum points for the lift bar, so that the lift bar acts as a lever for raising and lowering the rear of the bed.

The forward portion of the lift bar has a U-shaped bight, with lift bar rails extending rearward, on either side of the bed. The lift bar rails are on an inner side of the frame side rails. A bed support bar is attached to, and extends between, the rear end of each lift bar rail. The rear end of the bed rests on the bed support bar, so that when the front of the lift bar is raised, the lift bar pivots on it pins and the bed support bar lowers the rear end of the bed into contact with the ground or pavement. The bed pins pivot in their brackets as the bed is lowered or raised, and are the axis about which the bed rotates.

OBJECTS OF THIS INVENTION

Based on the above, it is an object of this invention to provide a tilt-bed trailer having a bed which may be easily lowered to a loading position, and easily raised when loaded to a towing position.

It is a further object of this invention to provide a tilt-bed trailer in which the bed is raised and lowered by a lever so that considerable loads may be safely raised by one person.

Another object is to provide a tilt-bed trailer design which may be utilized for small loads such as riding lawn mowers or motorcycles, and also for heavier loads such as fork lifts and automobiles.

Further objects are to achieve the above with devices that are sturdy, durable, simple, safe, efficient, versatile, and reliable, yet inexpensive and easy to manufacture, operate, and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 2 is a plan view of the lift bar.

FIG. 3 is a plan view of the bed frame with bed pins.

FIG. 4 is a detail of a lift bar brackets mounting.

CATALOG OF THE ELEMENTS

Figure 1:
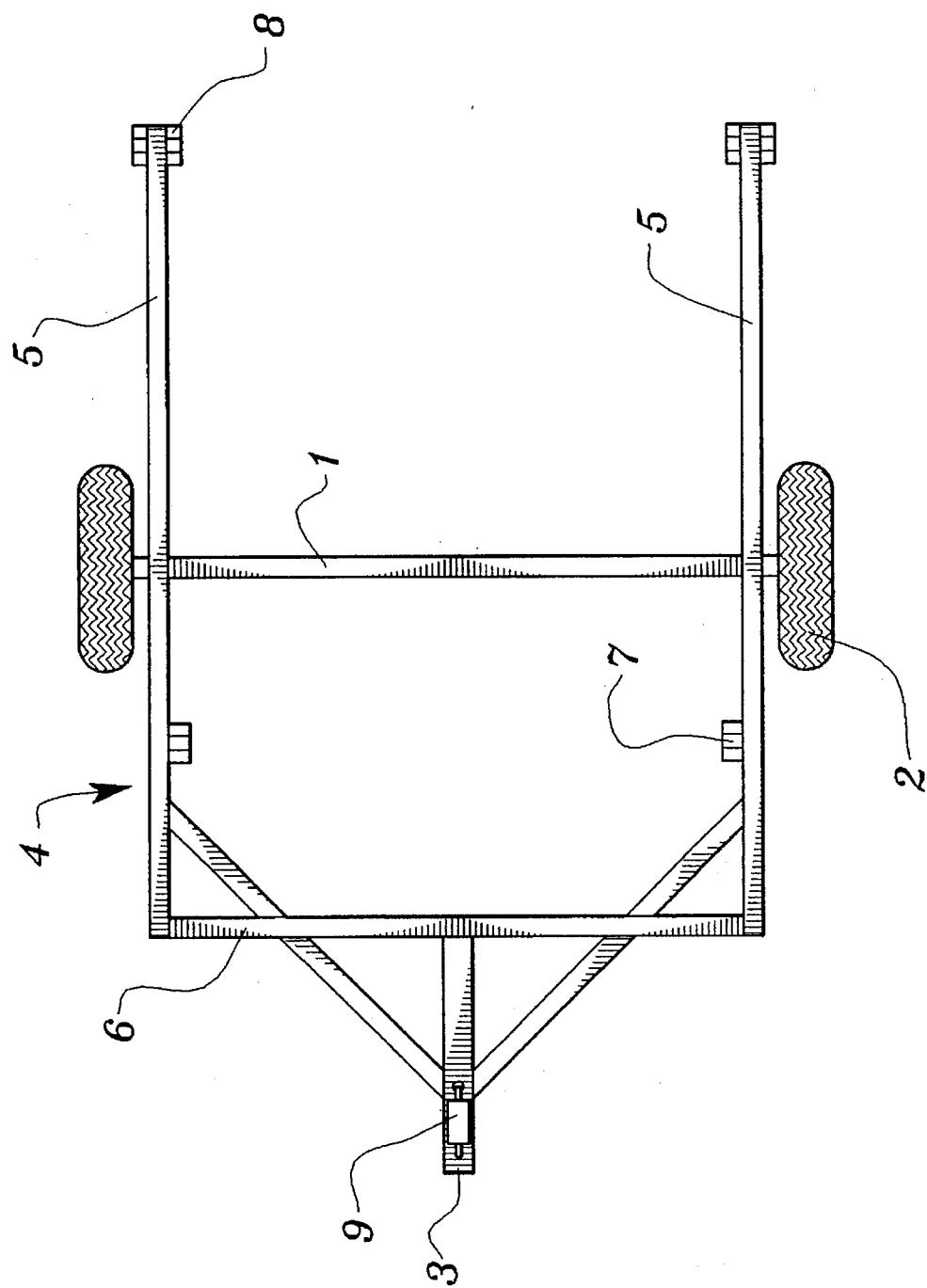
FIG. 1 is a plan view of the bed frame with wheel and axle assemblies, tongue, and lock.

To aid in the correlation of the elements of the invention to the exemplary drawings, the following catalog of the elements is provided:
1 Axle Assembly
2 Wheel and tire assembly
3 Tongue and coupling
4 Trailer frame
5 Frame side rails
6 Frame front bar
7 Bed bracket support
8 Lift bracket support arm
9 Lock
10 Lift Bar side rails
11 Lift bar angle bars
12 Lock bar
13 Bed support bar
14 Bed side rails
15 Cross braces
16 Bed bracket pin
17 Lift bracket pin
18 Spring and hanger assembly
19 Trailer bed
20 Lift bar

DESCRIPTION OF THE PREFERRED EMBODIMENTS

Referring to the drawings, a pair of ground-engaging wheel and tire assemblies 2 is joined by an axle 1. Half-elliptic leaf springs or other type of suspension serve as support for the trailer frame. Depending on the intended load capacity, additional pairs of wheels with their axles may be used to support the frame.

The trailer frame is constructed in a U-shape, with side rails 5 and a frame front bar 6. A tongue and coupling 3 are attached to the front bar 6 to provide means for attaching the trailer to a towing vehicle. Tongue braces 4 strengthen the tongue.

Figure 5:
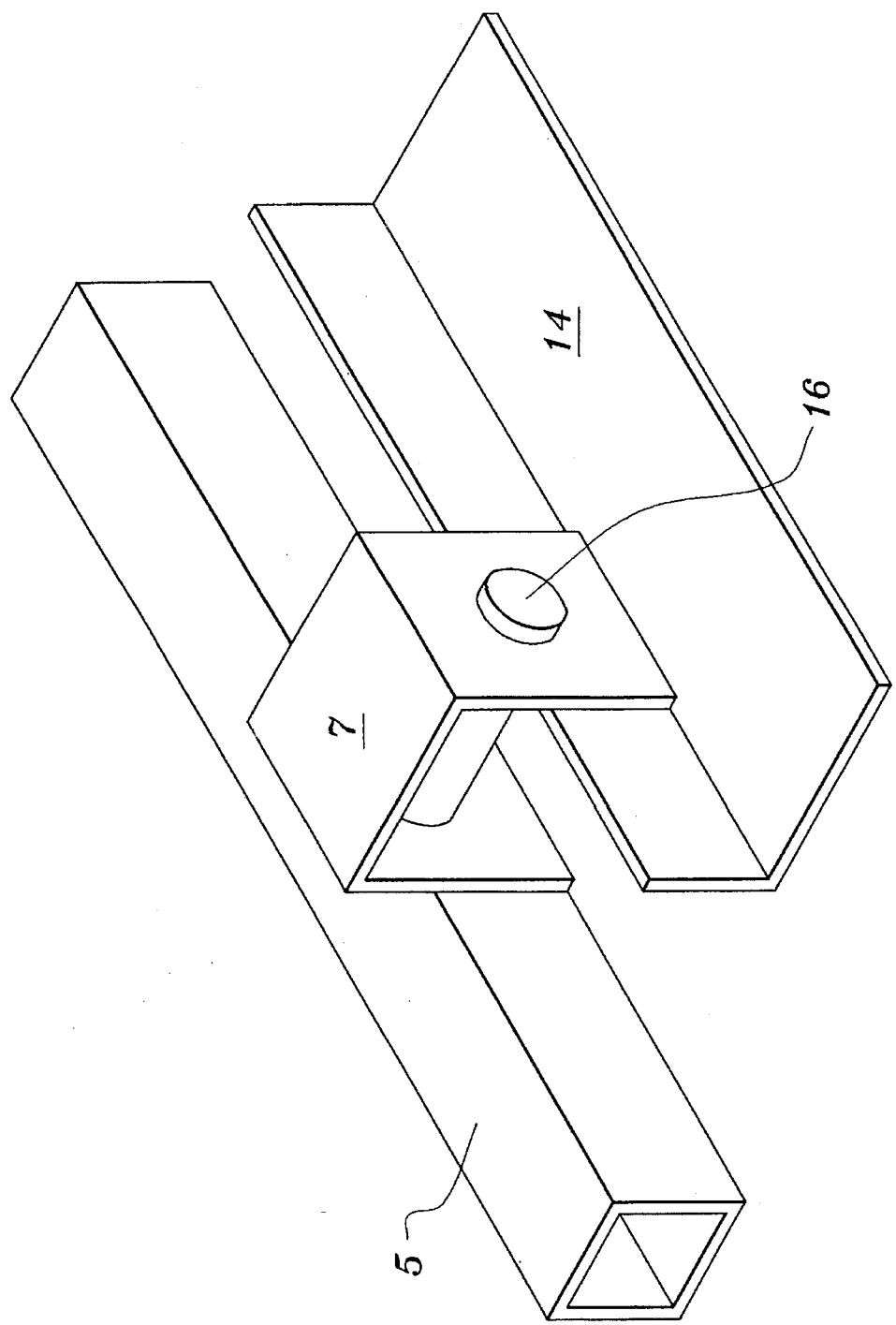
FIG. 5 is a detail of the bed bracket mounting.

On an inside surface of each frame side rail 5 a bed bracket 7 is attached; the bed brackets serve as supports for the forward portion of the bed. The bed brackets 7 receive bed bracket pins 16 which are attached to an outer surface of the tiltable trailer bed 19. FIG. 5 is a detail illustrating the relationship of frame side rail 5, bed bracket 7, bed bracket pin 16, and bed side rail 14. Pivoting on the bed brackets 7, the bed bracket pins 16 allow the trailer bed 19 to tilt, as described below, so the rear end of the bed may be lowered to ground level. Alternatively, the brackets may be attached to a side of the bed, and the pins attached to an inside surface of the frame side rails.

Referring to FIG. 2, manually tilting the bed 19 is accomplished by a lift bar 20 which acts as a lever to raise and lower the rear end of the trailer bed. In the preferred embodiment, the lift bar 20 is U-shaped, with two lift bar side rails extending toward the rear of the trailer frame. The U-shape at the forward portion of the lift bar is formed by lift bar angle bars 11 and lock bar 12. A lock bar 12 forms the front of the lift bar 20, and provides a hand-hold for manually operating the lift bar.

Referring to FIG. 4, at or near the rear end of each frame side rail 5 are lift bar brackets 8, to which an arm of the lift bar 20 is pivotally attached. This attachment point is the fulcrum about which the lift bar rotates.

Figure 6:
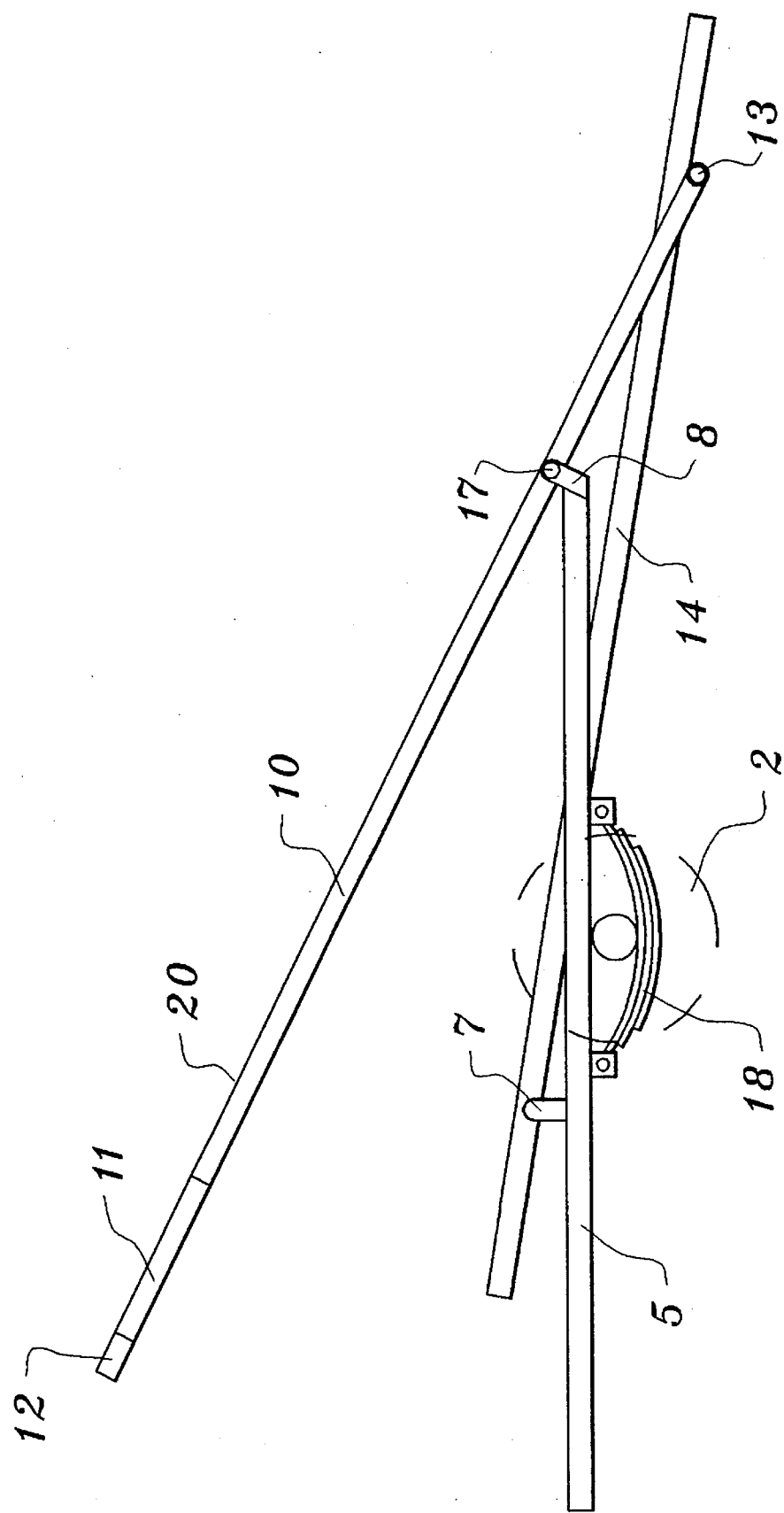
FIG. 6 is a side elevation showing the relationship of the trailer frame, trailer bed, and lift bar with the bed lowered to the loading position.
Figure 7:
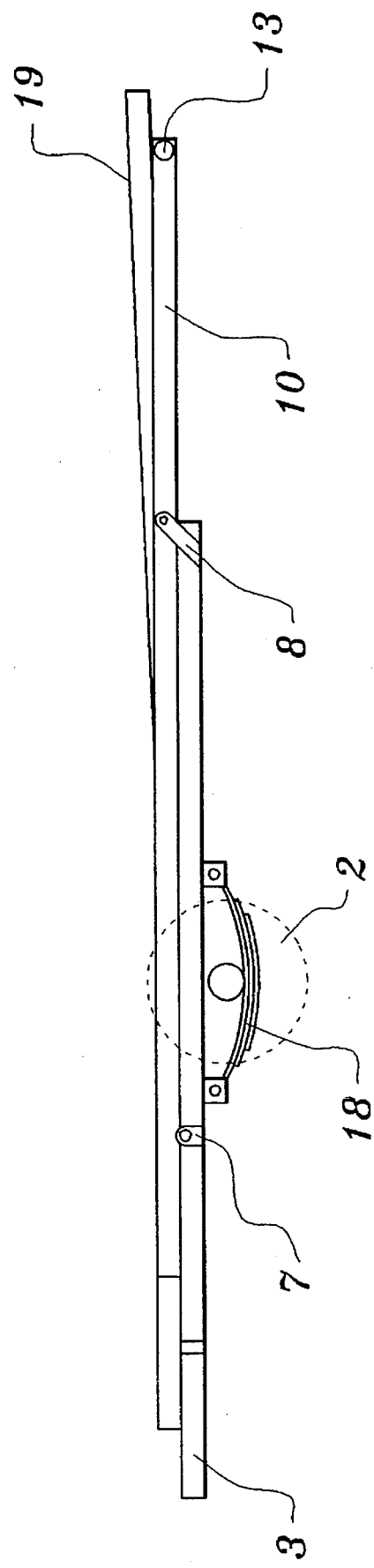
FIG. 7 is a side elevation showing the relationship of the trailer frame, trailer bed, and lift bar with the bed raised to the towing position.

The lift bar arms extend past the lift bar brackets, toward the rear of the trailer, as shown in FIG. 6 and FIG. 7. That is, the lift bar arms 10 are longer than the side rails 5 of the trailer frame. At a rear end of the lift bar arms, the arms are joined by a bed support bar 13 which attaches between the rear ends of each lift bar arm.

The trailer bed 19 rests on and is supported by the bed support bar 13, but is not attached to the bar. This arrangement allows relative movement between the bed and the support bar.

As the front end of the lift bar is raised, the lift bar pivots on the lift bar brackets so that the rear end of the lift bar is lowered. The rear end of the bed, resting on the support bar, is thus lowered toward ground level for loading. After loading, the front end of the lift bar is manually pulled down, acting as a lever to raise the rear of the trailer to a towing position.

The embodiments shown and described above are only exemplary. I do not claim to have invented all the parts, elements, or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim:

1. A lever-operated tilt-bed trailer, comprising:

a) A frame, b) A tiltable trailer bed having a front and a rear, c) The front of said tiltable trailer bed pivotally engaging said frame, d) A lifting bar pivotally engaging said frame at a fulcrum point, with e) The rear of said trailer bed supported by a rear end of said lifting bar, f) One or more pairs of ground-engaging wheels, g) An axle connecting each pair of said wheels, h) Said frame supported by said axle, i) Said frame including a tongue at a forward end of said frame, and j) Said tongue including a coupling for hitching said trailer to a towing vehicle.

2. A lever-operated tilt-bed trailer, comprising:

a) A frame, b) A tiltable trailer bed having a front and a rear, c) The front of said tiltable trailer bed pivotally engaging said frame, d) A U-shaped lift bar pivotally engaging said frame at a fulcrum point, with e) The rear of said trailer bed supported by a rear end of said lift bar, f) One or more pairs of ground-engaging wheels, g) An axle connecting each pair of said wheels, h) Said frame supported by said axle, i) Said frame including a tongue at a forward end of said frame, j) Said tongue including a coupling for hitching said trailer to a towing vehicle, k) Said frame having frame side rails, l) At least one bed bracket attached to said frame side rails, m) At least one lift bar bracket attached to said frame side rails, n) Said lift bar pivotally supported by said lift bar bracket, o) Said lift bar having a towing position and a loading position, p) bed support bar connecting two lift bar side rails at a rearward end of said lift bar side rails, q) Said bed having bed side rails, r) A bed bracket pin attached to a forward portion of each bed side rail, said bed bracket pin pivotally engaging one bed bracket, s) a lock mounted on a forward portion of said trailer frame for releasably locking said lift bar in a towing position, t) Said lock engaging said lift bar to hold a front end of said lift bar in a towing position, and u) Said lock when released allowing upward movement of the front end of said lift bar.

\* \* \* \* \*